Figure 4:
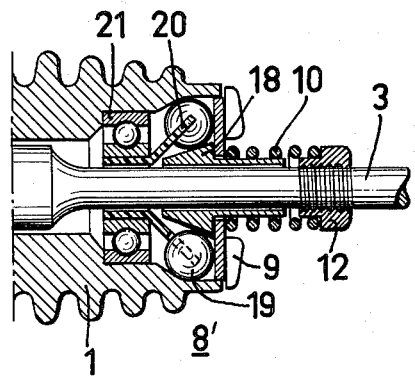

Sept. 28, 1965  B. A. ÅGREN  3,208,307
HANDLE FOR GRINDING OPERATIONS
Filed May 15, 1963  2 Sheets-Sheet 1
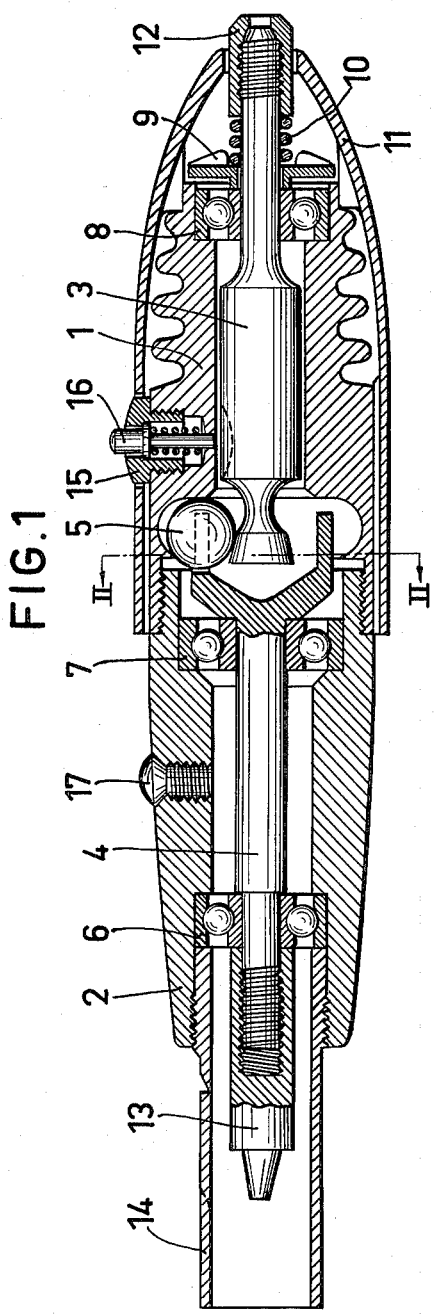
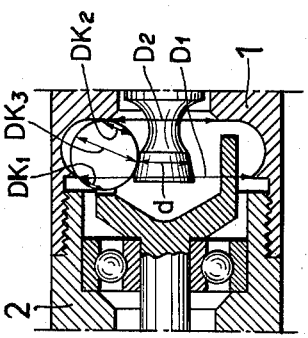
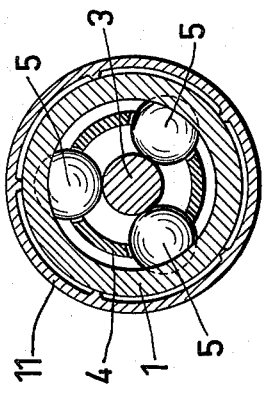
INVENTOR
BENGT ASSAR ÅGREN
BY Darby & Darby
ATTORNEYS Sept. 28, 1965  B. A. ÅGREN  3,208,307
HANDLE FOR GRINDING OPERATIONS
Filed May 15, 1963

INVENTOR
BENGT ASSAR ÅGREN
BY Darby & Darby
ATTORNEYS

United States Patent Office 3,208,307
Patented Sept. 28, 1965

3,208,307
HANDLE FOR GRINDING OPERATIONS
Bengt Assar Ågren, Enköping, Sweden, assignor to
Elling Harald Nordin, Enköping, Sweden
Filed May 15, 1963, Ser. No. 280,619
Claims priority, application Sweden, Nov. 20, 1962,
12,435/62
6 Claims. (Cl. 74—798)

This invention relates to a handle adapted for use in connection with commercially available electric motors and hand-operated drilling machines, preferably of the type provided with flexible shafts to be connected with working tools for grinding, drilling and cutting operations carried out with grinding pins and cemented carbide tools which, for increasing the number of revolutions, have small diameters, down to 1 millimeter. The number of revolutions within which the shafts and the motors employed may operate is upwardly very limited, the values usually being between 2000 and 12,000 r./m.

The handle according to the invention renders it possible to effect 25,000 to 75,000 r./m. and more without greater friction losses or disturbing heat development. This is obtained by a handle comprising a casing with an input shaft coupled with the drive motor and an output spindle coupled with the tool. According to the invention, the inner end portion of the input shaft is widened to form a tube which is provided with preferably three recesses wherein balls are located, which balls with their surface facing towards the centre axis of the casing abut against the inner end of the spindle projecting into the said tubular end of the shaft, and outwardly abut against a race in the casing, in such a manner, that upon rotation of the input shaft the balls perform a planetary motion and by friction cause the spindle to rotate with a number of revolutions which is a product of the number of revolutions of the input shaft and the gear ratio depending on the spacing between the contact points of the balls with the race of the casing and the centre of rotation of the balls. The handle is constructed so that the centre of rotation of the balls is inclined relative to the planetary movement, the balls rotating perpendicularly to the two main movements (planetary and rotary movements), so that the balls are subjected to uniform wear on all points of their surface. As the contact pressure of the balls is relatively small, a certain amount of sliding may occur.

The inner end of the output spindle widens conically towards the end. The outer end of the spindle is mounted slidably in the inner ring of a ball bearing provided in the casing. A compressor spring arranged between a thrust washer abutting against the bearing and a tightening nut on the outer end of the spindle tends to draw the spindle outwardly, thereby holding the inner end of the spindle in constant frictional engagement with the balls and also balancing possible wear and bearing clearance.

The front end of the spindle is supported in a special high-speed bearing with only three balls, the ball support being mounted in a special collar bearing, and the races which are conicaly relative to each other are kept pressed against each other by means of a compression spring, preferably the same spring which tends to draw the spindle out of the housing.

It is possible to connect several handles or several shafts in a handle in series thereby obtaining optional gear ratios.

The invention is described in the following, reference being had to the accompanying drawings showing an embodiment of the invention.

Figure 5:
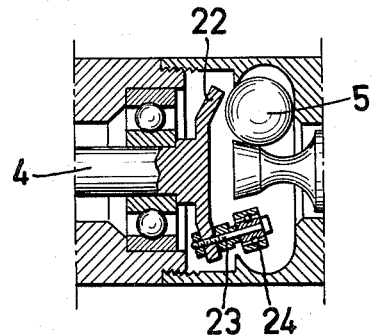

FIG. 1 shows a longitudinal section through the handle.
FIG. 2 shows a cross-section along the line II—II in FIG. 1.
FIG. 3 shows the planetary gear in detail, with the designations for calculating the gear included.
FIG. 4 shows part of the front high-speed bearing of the spindle.
FIG. 5 shows a modified embodiment of the planetary gear with only rolling friction.

As appears from FIG. 1, the casing of the handle comprises a rear half 2 with the input shaft 4 mounted therein on ball bearings 6 and 7. The rear end 13 of the shaft 4 is enclosed by a sleeve 14 for connection with the flexible shaft of a drilling machine for electric motor (not shown). The rear half 2 of the casing includes further an oil filler plug 17. By means of a thread, a front half 1 of the casing is connected with the rear half 2 of the casing, said front half being made of hardened steel and including the output spindle 3 mounted in a front bearing 8 and rearwardly on the balls 5, which balls at the same time transfer the driving power from the shaft 4 to the spindle 3. In the said casing half 1 there is further formed a race for the balls 5, and a lock device 15, 16 for the spindle. The front portion of the casing half 1 is provided with cooling flanges and enclosed by a cover 11, in such a manner, that cooling air is supplied by the disk 9 which is provided with fan blades and mounted between the bearing 8 and a tightening nut 12. Said disk 9 is pressed against the bearing 8 by a compression spring 10 the function of which will be described below.

The planetary gear is constructed so that the front portion of shaft 4 facing the spindle 3 is of tubular shape and provide with three recesses wherein the balls 5 are located (FIG. 2). Said balls abut with their surface facing to the centre axis of the casing against the conical rear end of the spindle 3, and contact with their outer surfaces at two points of the race formed in the casing half 1. Spindle 3 which is drawn in forward direction in the casing half 1 by the compression spring 10 produces, thus, with its conical inner end a constant frictional engagement with the balls 5 and eliminates also thereby bearing play (angle contact).

The front end of the spindle may also be mounted in a high-speed bearing 8' (FIG. 4) specially adapted for high numbers of revolutions. The said bearing comprises an internal conical race 18 and a likewise conical external race formed in the casing half 1, between which races three balls 19 are mounted. By means of previously mentioned compression spring 10, the internal race 18 is pressed against the said balls, whereby bearing play is eliminated. The ball holder 20 is supported in a support 21 of its own, said support having its seat in casing half 1. The advantage of this type of bearing over known bearings lies in the reduced heat development due to the smaller number of contact points and in the fully satisfactory centering of the ball holder which prevents unbalance.

FIG. 5 shows another embodiment of the planetary gear with only rolling friction, which is obtained in that instead of the tubular end with recesses in shaft 4, three pins 23 are mounted in a flange 22 on shaft 4, on which pins ball bearings 24 abutting the sides of the balls 5 are mounted.

The handle according to the invention operates as follows. The drive shaft 4 is driven in a suitable manner by a drive motor, for example via a flexible shaft, a belt or another type of power transfer. Upon rotation of shaft 4, the balls 5 perform a planetary movement, thereby driving the spindle 3 with a higher number of revolutions. Said number may be adjusted by displacing the contact points of the balls with the race of casing half 1 outwardly or inwardly towards the centre of rotation of the balls. Due to the inclination of the centre of rotation of the balls to the planetary movement, the balls due to the gyro forces will try to rotate under operation perpendicularly to the two main directions. In view thereof, no local wear will occur. As the balls abut only with a slight pressure, a certain sliding is possible. Referring to the designations given in FIG. 3, the formula for calculating the gear ratio of the handle will be as follows:

$$a \times \left[ \left( \frac{D_1+D_2}{2} \div d \right) \times \left( DK_3 \div \frac{DK_1+DK_2}{2} \right) \right] + a = X$$

where $a$ is the number of revolutions of the input shaft, X is the gearing ratio and the remainder of the designations correspond to those shown in FIG. 3.

By varying the diameter of the rear conical part of the spindle and by increasing or reducing the diameter of the balls, it is possible to attain in practice any gear ratio within the limits 1:2 and 1:20. By connecting in series gears in several steps can be obtained, for example the first step 1:10×the second step 1:10=1:100.

What I claim is:

1. In a handle of the type having an input shaft adapted to be driven and an output spindle axially aligned with the input shaft and adapted to drive a tool, in combination, an input shaft rotatably mounted in the handle and terminating in a radially enlarged portion having axially extending members forming recesses therebetween, a plurality of balls one located in each of said recesses, a stationary ball race surrounding said shaft extensions, said ball race being formed to be contacted by said balls along two circular lines of contact spaced apart a distance less than the diameter of said balls and an output spindle having a conical inner end, said conical end being contacted by said balls along a circular line of contact, said line of contact on said balls being at substantially the diameter of the balls, said radially enlarged shaft portions, said balls, said stationary raceway and said conical spindle end constituting a frictional planetary drive, the ratio of which can be modified by altering the diameters of said circular line of contact of said raceway without altering the radial dimension of the handle.

2. A device in accordance with claim 1 wherein said two circular lines of contact of said balls on said raceway are of slightly different diameters whereby said balls rotate at a lower rate on an axis at an angle to their major axis of rotation to thereby distribute wear over the surfaces of said balls.

3. A device in accordance with claim 1 wherein said output spindle is resiliently urged in a direction to maintain said balls in contact with said raceways and the conical end of said outptut spindle.

4. A device according to claim 3 wherein said resilient means for urging said output spindle comprises a bearing mounting the outer end of said spindle for rotation and axial movement, a nut mounted on said spindle adjacent its terminal end and a spring extending between said bearing and said nut to urge said spindle outwardly.

5. A device according to claim 1 wherein said axial extensions of said input shaft comprise pins, said pins having ball bearings mounted thereon, said ball bearings forming the recesses.

6. A device in accordance with claim 1 wherein said output spindle is mounted for rotation and axial movement in a race having a conical outer surface and wherein said output spindle is provided with a conical raceway in the form of a sleeve rotatable with said spindle and slidable thereon, a plurality of balls bearing against said conical inner and outer raceways, said assemblage of raceways and balls constituting the rotatable support for the outer end of said spindle, said inner conical raceway being spring pressed inwardly to maintain said balls in frictional contact with said raceways.

References Cited by the Examiner

UNITED STATES PATENTS

| 1,399,443 | 12/21 | Rennerfelt | 74—798 |
| 1,490,340 | 4/24 | Nielsen | 74—798 |
| 2,703,992 | 3/55 | Hine et al. | 74—798 |

DON A. WAITE, *Primary Examiner.*